June 28, 1938.　　F. SCHRÖTER ET AL　　2,121,990
TELEVISION
Filed Aug. 4, 1934
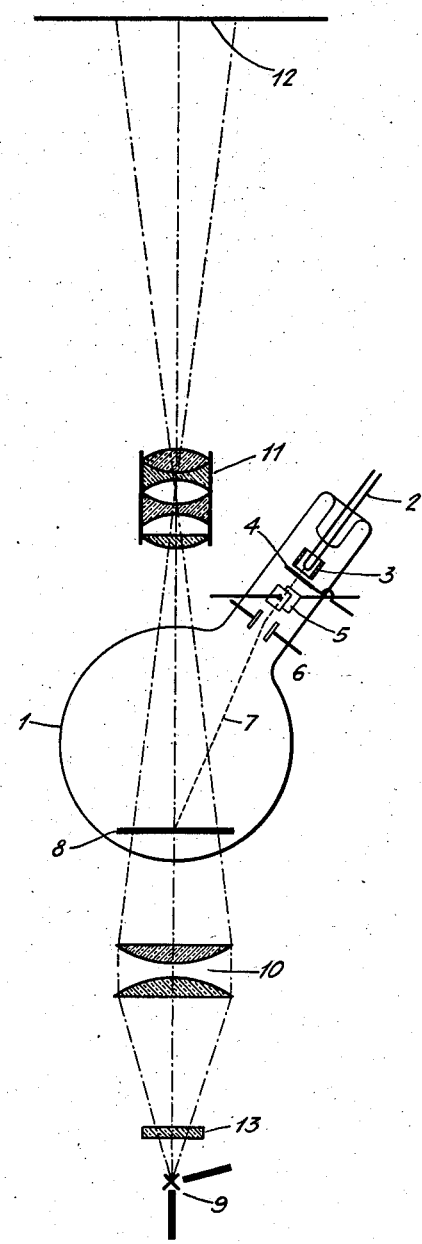
INVENTORS
FRITZ SCHRÖTER
ARTHUR SCHLEEDE
BY
ATTORNEY Patented June 28, 1938

2,121,990

UNITED STATES PATENT OFFICE 2,121,990

TELEVISION

Fritz Schröter, Berlin, and Arthur Schleede, Leipzig, Germany, assignors to Telefunken Gesellschaft für Drahtlose Telegraphie m. b. H., Berlin, Germany, a corporation of Germany Application August 4, 1934, Serial No. 738,430
In Germany July 27, 1933

3 Claims. (Cl. 178—7.5)

The present invention relates to an arrangement for strong light projection of television receiving pictures by the aid of a cathode ray tube, frequently referred to as the kinescope, as a picture point distributor, whose function however differs from the usual working performance.

One mode of application of cathode ray tubes as hitherto known, is based upon the luminescence of a luminous screen excited by the impinging electrons, whereby the screen becomes its own light source thus reproducing the receiving picture.

In accordance with the present invention no direct use is made of the luminous excitation of the screen. The fundamental idea of this invention resides rather in producing on a suitably prepared picture screen locally distributed and optically different conditions, under the influence of the cathode ray sweeping the screen and which is of variable intensity corresponding from point to point with the brilliancy of the picture to be transmitted. The said conditions are transformed on a projection screen or on a frosted disk into a field of light and dark distribution forming the visible receiving picture, by the aid of an optical system and of a foreign source of light.

An embodiment of the inventive idea will be described in the following as an example therefor. In this connection use is made of the phenomenon that certain phosphorescent substances, when being subjected to the radiation of cathode ray energy, undergo a change in their optical absorption capacity occurring practically without inertia. This phenomenon can be explained by the fact that the centers of excitation of the phosphorescent substances are capable in the non-excited condition, to absorb light of certain wave ranges, and to transform the same into another form of energy (heat, phosphorescence). This signifies that the respective phosphorescent substance optically absorbs light of that wave range under ordinary conditions. If, however, the said excitation has once taken place, i. e. if the centers of excitation of the phosphorescent substance are once charged with potential energy, a further absorption of light now ceases and only begins anew later on in a measure in which the phosphorescent substance tones down, i. e. to the degree in which it centers will again be discharged. The length of time required therefor lies for various materials within very wide limits for instance between one millionth of a second and several hours, so that in accordance with the desired time of relaxation suitable substances can be found. It is seen that the excitation of the phosphorescence and hence the elimination of its optical absorption can be carried out even in a much more effective way by the application of cathode ray energy, than in the case of light. Thus, it can be accomplished to so prepare the picture screen of a cathode ray tube that its optical absorption of the impinging light will be controlled by the impinging cathode ray, whereby in suitably selecting the preparation an appropriate time of relaxation of the condition of absorption can be produced.

The accompanying drawing elucidates the application of such cathode ray tube for the television reception, in a schematical manner. The cathode ray tube 1 contains a cathode 2, a Wehnelt cylinder 3, an anode 4, and two pair of control or deflecting electrodes 5 and 6 as usual. The cathode ray 7, shown in dotted line, sweeps the surface 8 of a picture screen prepared as described, and which serves at the same time as a diaphragm for a projection means. The latter consists for instance of an arc lamp 9, a condenser lens system 10, a projection lens 11 and projection screen 12. A light filter 13 may also be inserted into the optical path of the light ray from the source 9. The light filter 13 filters out the range of rays of the light source most favorable for the absorption effect.

The functioning of the arrangement will be readily understood from what has been above explained. The phosphorescent plate 8 whose optical absorption is controlled by the cathode ray takes here the place of an ordinary diapositive of a projection apparatus. If for the use of a certain screen substance it is found to be advantageous to use the ultra-violet range of the spectrum for the illumination, instead of an arc lamp, an ultra-violet source of light may be used, whereby the picture wall 12 must be formed of an ordinary fluorescent screen in order to obtain an optically visible picture.

Another mode of execution of the inventive idea replaces the phosphorescent plate 8 by means of an optical medium, whose index of refraction will be varied by the heat effect of the impinging cathode ray. For this purpose mica is suited for instance which in the form of a very thin plate can be inserted into the cathode tube and due to its low mass affording the advantage of a small thermic inertia. At the operation of such cathode ray tube a thermic reproduction of the television picture is next produced on the mica plate to which corresponds according to the above an index of refraction which is different from point to point. This distribution may for instance be transformed into a black and white projection picture by means of the known method of Toepler. The mica plate may however be also inserted in a polarization optics between two crossed nicols indicating the produced optical inhomogeneities by an increased brilliancy of the field of view at the respective places thus making the receiving picture visible.

Having now described the invention, what is claimed is:

1. In a television receiver, the combination of a cathode ray structure containing a fluorescent screen, a constant intensity light source arranged to irradiate one face of said screen, a light filter and optical system interposed between said light source and screen, means for directing a beam of electrons upon the opposite face of said screen to control the light of the screen, and an optical system to project the image formed by the light source and the beam of electrons on said screen upon a viewing screen.

2. In a television receiver for reproducing electro-optical images, the combination of a cathode ray tube equipped with a fluorescent screen and means for moving a beam of electronic energy in a predetermined manner, a constant intensity light source, a light filter and optical system interposed between said light source and one face of said screen to flood the area thereof, means for directing the beam of electronic energy on the opposite face of said screen to control the light of the screen, and an optical system for projecting the luminous image formed by the light source and the beam of electrons on said screen upon a viewing screen.

3. In a television receiver for reproducing electro-optical images, the combination of a cathode ray tube equipped with a fluorescent screen and means for moving a beam of electronic energy in a predetermined manner, a constant intensity light source, a light filter and optical system interposed between said light source and one face of said screen to flood the area thereof, means for directing the beam of electronic energy on the opposite face of said screen to control the light of the screen, a source of electric signaling impulses, means for varying the intensity of said electron beam in accordance with the intensity of said electric impulses, and an optical system for projecting the luminous image formed by the light source and the beam of electrons on said screen upon a viewing screen.

FRITZ SCHRÖTER.
ARTHUR SCHLEEDE.